United States Patent [19]

Kannapan et al.

[11] Patent Number: 4,723,453
[45] Date of Patent: Feb. 9, 1988

[54] ECCENTRIC DIFFERENTIAL SCREW ACTUATING, TORQUE MULTIPLYING AND SPEED CHANGING DEVICE

[76] Inventors: Srikanth M. Kannapan; Kurt M. Marshek, both of 9701 Courtleigh Cir., Austin, Tex. 78759

[21] Appl. No.: 20,169

[22] Filed: Feb. 26, 1987

Related U.S. Application Data

[63] Continuation of Ser. No. 514,090, Jul. 15, 1983, abandoned.

[51] Int. Cl.$^4$ ............................................. F16H 25/20
[52] U.S. Cl. .............................. 74/89.15; 74/424.8 R
[58] Field of Search ................. 74/89.15, 99, 424.8 R, 74/424.8 B, 424.8 VA, 89, 424.7; 251/58

[56] References Cited

U.S. PATENT DOCUMENTS

| | | | |
|---|---|---|---|
| 2,590,745 | 3/1952 | Wuensch | 74/424.8 B |
| 2,743,618 | 5/1956 | Watson et al. | 74/99 |
| 3,007,358 | 11/1961 | Vogel et al. | 74/424.8 R |
| 3,183,792 | 5/1965 | Allen | 74/99 |
| 3,184,214 | 5/1965 | King | 74/89.15 |
| 3,248,132 | 4/1966 | Pierce | 74/424.8 R |
| 3,329,069 | 7/1967 | Feroy | 74/89.15 |
| 3,583,248 | 6/1971 | Langenberg | 74/424.8 R |
| 3,731,546 | 5/1973 | MacDonald | 74/89.15 |
| 4,266,437 | 5/1981 | Obergfell | 74/424.8 R |

FOREIGN PATENT DOCUMENTS 1265365  5/1961  France ................. 251/58

*Primary Examiner*—Lawrence Staab

[57] ABSTRACT

An eccentric differential screw usable for torque multiplying, speed changing, positioning and actuating functions is disclosed. The disclosed device produces output between fixed output member positions.

A rotatable shaft having threaded portions, constrained axially, acting as a screw, is threadably engaged by fine threads to a floating nut-screw acting as a nut. The same floating nut-screw acting as a screw axially eccentric with respect to the axis of the said fine threads is threadably engaged by coarse threads to a rotatable nut. The unique motions of the parts and the self-locking behavior of the device being made achievable by the eccentricity of the axes of the said fine and coarse threads. The speed ratio of the device is dependent on the ratio of the leads of the fine and coarse threads.

5 Claims, 3 Drawing Figures

ECCENTRIC DIFFERENTIAL SCREW ACTUATING, TORQUE MULTIPLYING AND SPEED CHANGING DEVICE

This is a continuation of application Ser. No. 06/514090, filed July 15, 1983 now abandoned.

BACKGROUND OF THE INVENTION

This invention relates to the actuating, torque multiplying and speed reducing devices with output members operable between fixed positions. It is especially applicable to the function of actuation of valves and other high torque rotary controls which are to be operated manually, electrically, hydraulically, and pneumatically. It is highly desirable to have compact actuating devices, and often convenient to have parallel input and output shafts.

SUMMARY OF INVENTION

The major objective of the invention is to provide a simple and effective means of multiplying torque and changing speeds for use in applications where a self-locking output between fixed positions is required. In the device disclosed, a torque multiplication and speed reduction is obtained by a differential screw. A fine thread on a rotatable shaft drives a coarse thread on a rotatable nut through a floating nut-screw. Self-locking and unique motions of the parts being made achievable by displacing the axes of the fine and coarse threads with respect to each other.

DESCRIPTION OF A PREFERRED EMBODIMENT

Figure 1:
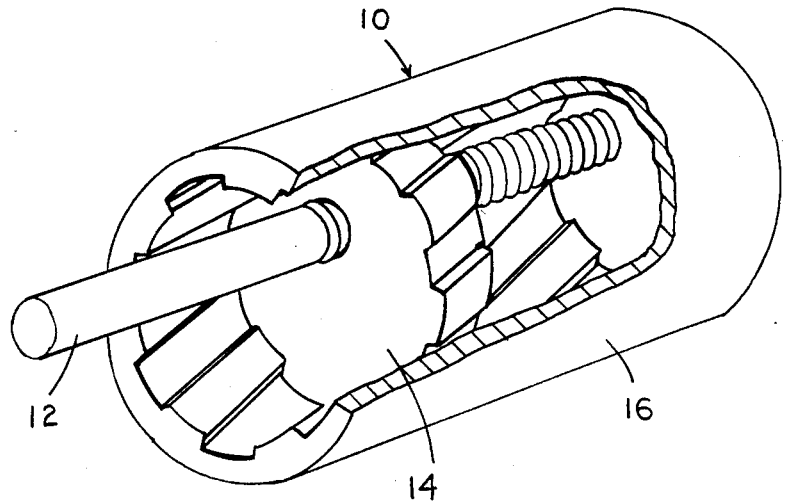
FIG. 1 is a schematic showing the major working principle of the device and configuration of the major parts.
Figure 2:
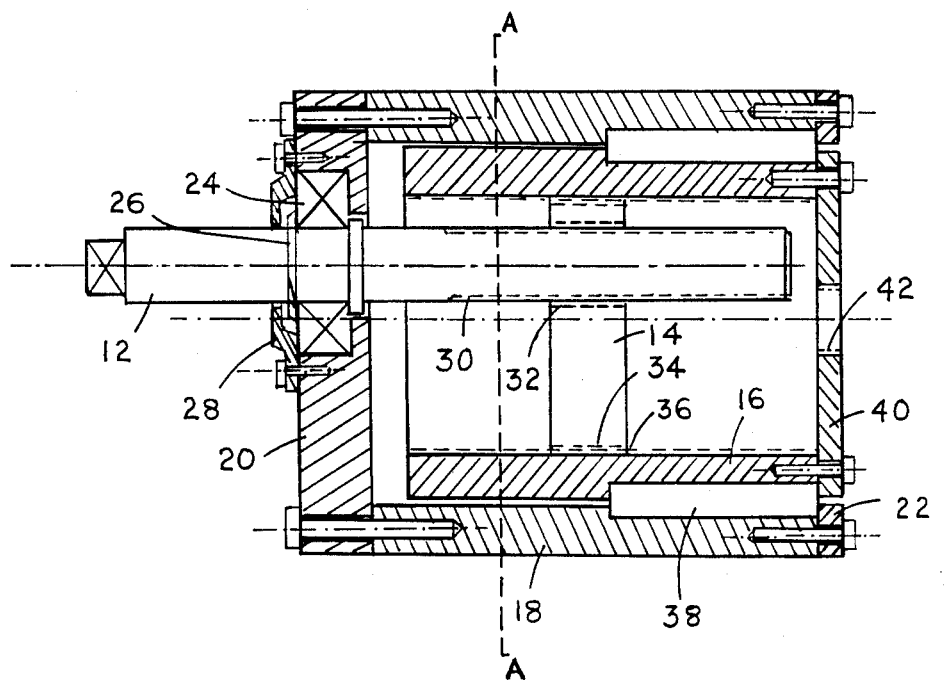
FIG. 2 is a longitudinal cross-section view of an embodiment of the device.
Figure 3:
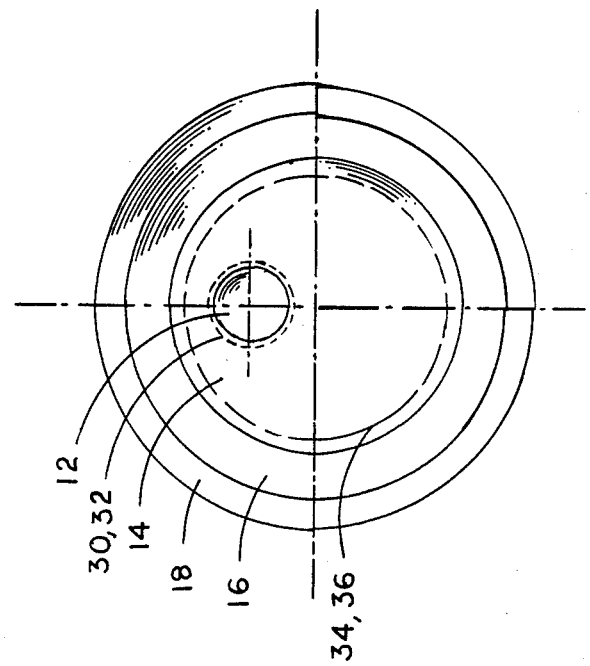
FIG. 3 is a view of section A—A of FIG. 2.

The major principle of operation of the device is illustrated in a perspective view in FIG. 1. Details of an embodiment of the device are shown in FIG. 2 and FIG. 3 by longitudinal and transverse sections, respectively. The part numbers given are consistent in FIG. 1, FIG. 2, and FIG. 3.

Referring to FIG. 1, numeral 10 designates a speed and torque changing device means, having a shaft 12 connecting through a first threaded means to a floating nut screw 14. The floating nut-screw 14 connecting through a second threaded means to a rotatable nut 16. For the disclosed device, a number of kinematic inversions are possible:

(a) with the shaft 12 as the input member and the nut 16 as the output member.

(b) with the shaft 12 as the input member and the floating nut-screw 14 as the output member.

(c) with the floating nut-screw 14 as the input member and the shaft 12 as the output member.

(d) with the floating nut-screw 14 as the input member and the nut 16 as the output member.

(e) with the nut 16 as the input member and the shaft 12 as the output member.

(f) with the nut 16 as the input member and the floating nut-screw 14 as the output member.

Also, in the above combinations, the member which is not used as an input or output member can be used as an additional input or output member of the device.

Referring to FIG. 2 and FIG. 3, an embodiment of the device is now described, wherein the shaft 12 is the input member and the nut 16 is the output member of the device. This corresponds to the kinematic inversion (a) mentioned above.

A housing 18 with end plates 20 and 22 may be provided. The shaft 12 is constrained axially by a bearing 24 and a retaining ring 26. The bearing 24 is seated between the end plate 20 and a bearing cover 28. On the side of the shaft 12 internal to the housing 18, in the assembled configuration, the shaft 12 is threaded partially along its length with fine threads 30. The threads 30 on the shaft 12 are engaged to matching threads 32 on the floating nut-screw 14. The same floating nut-screw 14 has on its periphery, coarse threads 34. The axis of the coarse threads 34 is displaced by a suitable amount with respect to the axes of the fine threads 30 and 32.

The coarse threads 34 engage with matching threads 36 on the inside of the nut 16. The nut 16 being axially constrained by a bearing 38 and a retaining plate 40. The bearing 38 is seated between a step in the housing 18 and the said end plate 22. Means are provided for the attachment of a shaft, to the nut 16 through a spline 42 provided on the retaining plate 40, axially aligned with respect to the coarse threads 34 and 36.

Although only one embodiment of the disclosed device is described here, it should be obvious that many modifications, arrangements, and alterations to the structure and application of the device would be possible by one skilled in the art, without departing from the spirit and essence of the invention, the scope of which is intended to be limited only by the following claims.

What is claimed is:

1. In a torque multiplying, speed changing, positioning and actuating device comprising:

a shaft, constrained axially by a step on said shaft pressed against a first bearing and retained in position by a retaining ring, with the first bearing seated in a first end plate covered by a bearing cover fastened to the first end plate, with said first end plate fastened to the first side of a cylindrical housing along the circumference of the said cylindrical housing, and with said shaft being threaded partially along its length with fine threads up to the end of said shaft away from the first bearing;

a floating nut-screw engagable as a nut by a first threaded means, to the fine threaded means of the said shaft, with the floating nut-screw having a second threaded means on its periphery to prevent sliding along the axes of the first and second threaded means, with the axis of the second threaded means displaced parallel from the axis of the first threaded means;

a rotatable nut, constrained axially by a step on the outer surface of said rotatable nut pressed against the first side of a second bearing, with the second side of the second bearing held against said rotatable nut by means of a retaining plate, with the retaining plate fastened to said rotatable nut, with the second bearing seated in said cylindrical housing with the first side of the second bearing against a step on the inside of said cylindrical housing, with the second side of the second bearing axially held against said cylindrical housing by means of a second end plate, with the second end plate fastened to the second side of said cylindrical housing along the circumference of said cylindrical housing, and with said rotatable nut engageable by threaded means on the periphery of said floating nut-screw such that a rotation of said shaft causes said floating nut-screw to move along the axes of the first and second threaded means thus causing slower rotation of said rotatable nut.

2. The device of claim 1 with attaching means on the rotatable nut.

3. The device of claim 1 with one or both of the threaded means of constant pitch.

4. The device of claim 1 with said shaft extending further along the axis beyond said retaining ring away from the threaded portion of said shaft with means to attach the said shaft to a rotatable member external to the device.

5. The device of claim 1 with the length of said floating nut-screw along the axis of the second threaded means being substantially smaller than one or both of the threaded lengths of said shaft and said rotatable nut, such that said floating nut-screw is able to move for a substantial distance within said rotatable nut.

* * * * *